3,091,542
INSOLUBILIZATION OF WATER-SOLUBLE CELLULOSE ETHERS

Arthur W. Anderson, Midland, Mich., assignor to The Dow Chemical Company, Midland, Mich., a corporation of Delaware
No Drawing. Filed Sept. 20, 1960, Ser. No. 57,110
8 Claims. (Cl. 106—188)

This invention relates to processes for insolubilizing water-soluble cellulose ethers and to cellulose ethers thus processed.

Water-soluble cellulose ethers are well known materials, common examples being the methyl, ethyl, carboxymethyl, hydroxyethyl, hydroxypropyl, sulfoethyl and similar ethers and mixed ethers containing two or more such etherifying groups. In general, such cellulose ethers are water-soluble over only a restricted range of degree of substitution. Thus, ethylcellulose having a very low degree of substitution is substantially insoluble, as is also that having a high degree of substitution. The water-soluble ethylcelluloses are primarily those in the middle range of degree of substitution. In all cases, the cellulose ethers here contemplated are those having sufficient degree of water-solubility to enable practical use of aqueous solutions thereof to form coatings, films, impregnating solutions and the like.

There are many industrial applications where it is desirable to apply a cellulose ether as an aqueous solution, thus to form a coating or film, impregnate a porous fibrous material or otherwise deposit the cellulose ether in a desired form and then convert it to a water-insoluble material. Such a converted ether is useful for the protection and/or reinforcement of the base article on which it is deposited.

For many uses, particularly in films, coatings and impregnations, water-soluble cellulose ethers require the addition of softeners or plasticizers to avoid excessive stiffness and brittleness. Most plasticizers suitable for such use are volatile and/or water-soluble, and hence, are easily lost from the plasticized product.

It is an object of the present invention to provide water-soluble cellulose ether compositions which contain effective water-soluble plasticizers, which can be readily converted to water-insoluble compositions and which, when so converted, retain their plasticized properties even when exposed to water. Other objects will appear hereinafter.

According to the invention, water-soluble cellulose ethers are both plasticized and rendered capable of insolubilization by the incorporation therein of about 1–30%, by weight, of a polyalkylene glycol diglycidyl ether. Ethers suitable for the purpose are the water-soluble and self-dispersing polyglycol derivatives corresponding to the formula

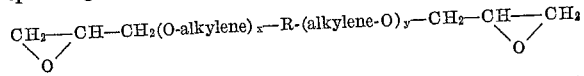

wherein O-alkylene represents an oxyalkylene radical wherein the alkylene radical is a 1,2-alkylene radical containing 2 to 3 carbon atoms; i.e., ethylene, 1,2-propylene or 1-chloro-2,3-propylene, R is the bivalent residue of a starter compound formed by the removal of two active hydrogen atoms from said compound; and $x$ and $y$ are integers whose sum has an average value of 2 to about 20. By "active" hydrogen atoms we mean those that are reactive toward alkylene oxides in the presence of the usual catalysts for the condensation of alkylene oxides. Such active hydrogen compounds include water, glycols, primary amines, bis(sec.-amines), alkanolamines, diphenols, amides, dicarboxylic acids, and the like. Since the residue of the starter compound usually constitutes only a minor portion of the entire molecule of the diglycidyl ether compound, its identity is of little significance. Its primary function is to furnish two active hydrogens as initiators for the alkylene oxide condensation whereby polyoxyalkylene chains are attached at the site of the active hydrogen atoms. For this reason, all such polyalkylene glycol compounds are referred to herein simply as polyalkylene glycols. Likewise, the term "alkylene" as used herein includes alkylene radicals containing a halogen, e.g., 1-chloro-2,3-propylene, the radical derived from epichlorohydrin.

It is well known that the higher polyalkylene glycols are not ordinarily obtainable as pure compounds but rather are cogeneric mixtures which can only be characterized by an average molecular weight or average number of oxyalkylene groups per molecule.

The mere incorporation of the above diglycidyl ethers into cellulose ethers plasticizes but does not insolubilize the latter. Insolubilization is accomplished by heating the plasticized material at about 60–200° C., and preferably at about 100–160°.

In addition to the diglycidyl ether, the cellulose ether composition may contain a catalyst for the reaction of glycidyl groups with aliphatic hydroxyl groups. Such catalysts are well known, the most commonly used ones being tertiary amines. Among the suitable ones are trimethylamine, triethylamine, the tripropylamines and, in general, the water-soluble trialkylamines wherein the alkyl groups may be the same or different; the trialkanolamines, such as triethanolamine; the heterocyclic bases such as pyridine, N-alkyl-piperidine, quinoline, N-alkyl-pyrroles and pyrrolidines, and the like. The amount of catalyst required is small, suitable amounts being about 0.1% to 1.0% by weight, based on the amount of diglycidyl ether used.

The cellulose ether-diglycidyl ether-amine composition is water-soluble or self-dispersible; hence, is readily used in impregnation, coating or film-forming operations. The resulting products are then dried, after which it is found that the cellulose ether composition is adequately plasticized but remains water-soluble or dispersible unless heated sufficiently to cause the glycidyl groups to react with the hydroxyl groups present in the composition. This latter "curing" or insolubilizing step is effected by heating the composition at about 60–200° C. The time required for the curing step is inversely related to the temperature. Thus, at relatively low temperatures, such as 60–100°, several hours may be required. On the other hand, at temperatures of 150–200°, a few minutes suffices. The amount of catalyst also helps determine the time required, the two being inversely related.

The degree of cure achieved is easily determined by measuring the percentage of the composition that is insoluble in water. The effectiveness of the plasticizer in the compositions is ascertainable by measuring the ultimate elongation of the composition. For the purposes of the invention it is desirable that the cured compositions have low water solubility, high elongation, high tensile strength and high flexibility.

The practice of the invention is illustrated by the following examples.

Examples 1–4

Methocel U.S.P. (25 cps.) and the diglycidyl ether of polyethylene glycol of average molecular weight 400 were dissolved in water (8% by weight of Methocel), a few drops of triethylamine per 100 cc. of solution was added and films were cast from the resulting solution. After the films had been thoroughly dried at room temperature they were tested for ultimate elongation and tensile strength to indicate the effectiveness of the diglycidyl ether as a plasticizer. The results are shown in the following table:

| Example No. | Diglycidyl Ether, Percent | Elongation, Percent | Tensile Strength, kg./cm.² |
|---|---|---|---|
| 1 | 0 | 12 | 700 |
| 2 | 7.14 | 25 | 555 |
| 3 | 11.86 | 30 | 500 |
| 4 | 18.30 | 50 | 483 |
|   | 31.00 | 50 | 254 |

Films prepared as above were cured by being heated in an oven at 150° C. for various periods of time, after which the percentage insolubilized was determined by immersing the films in distilled water at 25° C. for 4 hours. The results are tabulated below:

PERCENT INSOLUBILIZED

| Example No. | 20 min. | 40 min. | 60 min. | 80 min. |
|---|---|---|---|---|
| 1 | 0.0 | 60.6 | 75.1 | 81.1 |
| 2 | 82.4 | 90.2 | 89.7 | 89.5 |
| 3 | 77.5 | 80.3 | 74.0 | 83.3 |
| 4 | 51.8 | 58.6 | 63.9 | 62.4 |
| Methocel | 0.0 | 0.0 | 0.0 | 0.0 |

It was observed that the plasticizing effect shown on the uncured films was not substantially affected by the curing operation; i.e., the cured films were plasticized to substantially the same degree as the uncured films.

Results similar to those shown above were obtained when the polyalkylene glycol used in making the diglycidyl ether contained an average of 2 to about 20 oxyalkylene units. In the higher molecular weight range the diglycidyl ethers of the polyoxyethylene glycols are more suitable than the other polyoxyalkylene glycols because of their more hydrophylic character.

*Examples 5–8*

In the following experiments, Methocel films containing the diglycidyl ether of diethylene glycol (Examples 5 and 6) or polyethylene glycol of average molecular weight 400 (Examples 7 and 8) were cured at 150° C. for sufficient time to insolubilize them, the cure times being shown below. Films were recorded as insoluble if they failed to dissolve or break when stirred in water at room temperature for 3 minutes with a stirrer operating at 650 r.p.m.

| Example | Percent Diglycidyl Ether | Cure Time, Min., to Insolubilize |
|---|---|---|
| 5 | 1.0 | 300 |
| 6 | 2.0 | 60 |
| 7 | 3.0 | 80 |
| 8 | 6.0 | 80 |

*Example 9*

The diglycidyl ether of polyepichlorohydrin of average molecular weight 450 was used at a concentration of 12 wt. percent to insolubilize Methocel as in the above examples. After a 10 minute cure at 150° C. the Methocel film was insoluble in water and had a tensile strength of 6670 p.s.i. and an ultimate elongation of 22%. After an additional 10 minutes of curing its tensile strength and elongation were 6430 p.s.i. and 17%, respectively.

*Example 10*

In tests similar to the above, the diglycidyl ether of dipropylene glycol, when used at a concentration of 9 wt. percent and the film cured 10 min. at 150° C., insolubilized the film. After a 20 min. cure the film was insoluble and had a tensile strength of 7400 p.s.i. and an ultimate elongation of 17%.

Likewise, other water-soluble cellulose ethers, such as carboxymethylcellulose, hydroxyethylcellulose, sulfoethylcellulose and hydroxypropyl-methylcellulose are plasticized and insolubilized by the diglycidyl ethers of the invention.

This is a continuation-in-part of my copending application, Serial No. 736,662, filed May 21, 1958, now abandoned.

I claim:

1. A composition of matter consisting essentially of a water-soluble cellulose ether and about 1 to 30% by weight of a diglycidyl ether of a polyoxyalkylene glycol containing about 2 to 20 oxyalkylene units, each of which units contains two to three carbon atoms.

2. A composition as defined in claim 1 wherein the cellulose ether is methylcellulose.

3. A composition as defined in claim 1 wherein the cellulose ether is hydroxypropyl-methyl cellulose.

4. A composition as defined in claim 1 wherein the polyoxyalkylene glycol is polyoxyethylene glycol.

5. A composition as defined in claim 1 comprising a catalytic amount of a tertiary amine.

6. A process for making a water-insoluble cellulose ether composition comprising mixing a water-soluble cellulose ether and about 1 to 30%, by weight, based on the total composition, of a diglycidyl ether of a polyoxyethylene glycol containing about 2 to 20 oxyethylene units and heating the resulting mixture at about 60° to 200° C. until it is substantially insoluble in water.

7. A process as defined in claim 6 wherein the temperature in the heating step is about 100–160°.

8. A process as defined in claim 6 wherein the cellulose ether is methylcellulose.

References Cited in the file of this patent

UNITED STATES PATENTS

| 2,328,679 | Rothrock | Sept. 7, 1943 |
| 2,730,427 | Suen | Jan. 10, 1956 |
| 2,764,568 | Hawkins | Sept. 25, 1956 |
| 2,842,451 | Grummit et al. | July 8, 1958 |